(12) United States Patent
Barnes

(10) Patent No.: US 10,253,553 B2
(45) Date of Patent: Apr. 9, 2019

(54) LUMINOUS APPARATUS

(71) Applicant: Farah Naz Pourbabai Barnes, Washington, DC (US)

(72) Inventor: Farah Naz Pourbabai Barnes, Washington, DC (US)

(*) Notice: Subject to any disclaimer, the term of this patent is extended or adjusted under 35 U.S.C. 154(b) by 0 days.

(21) Appl. No.: 15/683,728

(22) Filed: Aug. 22, 2017

(65) Prior Publication Data

US 2018/0080274 A1 Mar. 22, 2018

Related U.S. Application Data

(60) Provisional application No. 62/534,857, filed on Jul. 20, 2017, provisional application No. 62/495,470, filed on Sep. 16, 2016.

(51) Int. Cl.

| | |
|---|---|
| *E06B 3/677* | (2006.01) |
| *B32B 17/10* | (2006.01) |
| *E06B 3/66* | (2006.01) |
| *E06B 3/663* | (2006.01) |
| *F21Y 115/10* | (2016.01) |

(52) U.S. Cl.
CPC .............. *E06B 3/677* (2013.01); *B32B 17/10* (2013.01); *E06B 3/6604* (2013.01); *E06B 3/66376* (2013.01); *B32B 2305/10* (2013.01); *B32B 2307/422* (2013.01); *F21Y 2115/10* (2016.08)

(58) Field of Classification Search
CPC ................ E06B 3/6604; B32B 2307/422
USPC ........... 362/605, 604, 615, 628, 632, 311.06, 362/311.13
See application file for complete search history.

(56) References Cited

U.S. PATENT DOCUMENTS

| | | | | |
|---|---|---|---|---|
| 4,835,661 A * | 5/1989 | Fogelberg | ............... | G09F 13/04 362/223 |
| 5,005,306 A * | 4/1991 | Kinstler | .................. | G09F 13/22 362/486 |
| 5,339,550 A * | 8/1994 | Hoffman | ................ | B60Q 1/503 362/497 |
| 5,555,654 A * | 9/1996 | Hermann | ............ | G09F 13/0413 362/604 |
| 5,625,968 A * | 5/1997 | Ashall | .................. | G02B 6/0043 362/604 |
| 5,913,594 A * | 6/1999 | Iimura | ................... | G01D 11/28 349/67 |
| 6,450,657 B1* | 9/2002 | Testa | .................... | G02B 6/0068 362/145 |
| 6,672,748 B2* | 1/2004 | Baldwin | ................. | G09F 13/00 362/222 |
| 6,860,629 B2* | 3/2005 | Velez | ...................... | G09F 19/22 362/559 |
| 7,186,015 B2* | 3/2007 | Kimmet | ................. | G09F 13/08 362/629 |

(Continued)

*Primary Examiner* — Paultep Savusdiphol
(74) *Attorney, Agent, or Firm* — Monty Simmons; Simmons PatentsX

(57) ABSTRACT

Disclosed is technology addressing lighting issues using a signature perforated design diffuser panel that provides a dual purpose—artistic and artificial light source. Stated differently, the disclosed technology provides diffused lighting while creating a signature geometric perforated pattern. When turned off, the technology is wall art, and, when turned on, it is wall art that provides a signature lighting experience. Embodiments also include the same diffuser technology used to modify and condition natural light sources (e.g. sun light).

20 Claims, 19 Drawing Sheets

(56) References Cited

U.S. PATENT DOCUMENTS

| | | | | |
|---|---|---|---|---|
| 7,278,770 | B2* | 10/2007 | Lu | G02B 27/024 |
| | | | | 362/604 |
| 7,281,834 | B2* | 10/2007 | Sinofsky | G01D 11/28 |
| | | | | 362/255 |
| 7,582,000 | B2* | 9/2009 | Pendlebury | H05B 33/145 |
| | | | | 313/483 |
| 7,802,892 | B2* | 9/2010 | Young | G09F 13/14 |
| | | | | 362/253 |
| 9,343,003 | B2* | 5/2016 | Podd | G09F 9/33 |
| 9,747,820 | B2* | 8/2017 | Sanders | G09F 7/10 |
| 2010/0009588 | A1* | 1/2010 | Ray | G09F 13/22 |
| | | | | 445/24 |
| 2010/0011638 | A1* | 1/2010 | Choi | G09F 13/04 |
| | | | | 40/446 |
| 2010/0319227 | A1* | 12/2010 | Sanders | G09F 7/10 |
| | | | | 40/546 |
| 2011/0317448 | A1* | 12/2011 | Podd | B60Q 1/2673 |
| | | | | 362/628 |
| 2013/0265754 | A1* | 10/2013 | Tsai | G02B 6/0083 |
| | | | | 362/231 |

* cited by examiner

LUMINOUS APPARATUS

CLAIM TO PRIORITY

This application claims priority to U.S. provisional application 62/495,470, filed 16 Sep. 2016, and provisional application 62/534,857, filed 20 Jul. 2017 of which all such references are incorporated by this reference for all that they disclose for all purposes.

TECHNICAL FIELD

The invention relates to novel ornamental and utilitarian features of designer luminous panel devices for providing artistic artificial lighting functions.

BACKGROUND OF THE INVENTION

Prior art lighting systems often use light diffusers to redistribute light from point sources or linear light sources to convert such concentrated light sources to more pleasing large area light sources. In optics, a diffuser is any device that diffuses or spreads out or scatters light in some manner, to give soft light. A Perfect Reflecting Diffuser (PRD) is a theoretical perfectly white surface with Lambertian reflectance (its brightness appears the same from any angle of view).

Diffused light can be easily obtained by making light reflect diffusely from a white surface. Diffusers can include ground glass diffusers, Teflon® diffusers, holographic diffusers, opal glass diffusers, and greyed glass diffusers. Such prior art diffusers are generally positioned between a light source and the area to be illuminated to distribute the light received over the area to be illuminated.

A diffractive diffuser is a kind of Diffractive Optical Element (DOE) that exploits the principles of diffraction and refraction. It uses diffraction orders to manipulate monochromatic light, giving it a specific spatial-configuration and intensity profile. Diffractive diffusers are commonly used in commercially available LED illumination systems. Usually, the diffuser material is GaN or fused silica with processed rough surfaces.

Most people know well the typical prior art devices employing solid panel diffusers for ceiling lighting which are often constructed from a translucent material to pass light and may further provide a printed pattern. Such prior art devices are designed for the primary purpose of providing light and may be somewhat aesthetically pleasing, however, clearly, only minimum efforts, if any, are made regarding aesthetics.

Such is unfortunate for the aesthetic quality of lighting is under appreciated. For example, it has been said that food is the prose of a party. If so, lights are its poetry. What prior art lighting systems fail to achieve is a marriage between art and light. More particularly, what is needed is an apparatus that uses art as a light source for a room, a light source whose primary purpose cannot be accurately described as art or lighting alone.

The disclosed technology addresses such issues with diffuser technology and lighting systems that utilize a signature perforated design diffuser panel that provides a dual purpose. It provides diffused lighting while creating a signature geometric perforated pattern. Thus, when turned off, it is wall art, and, when turned on, it is wall art that provides lighting, and not just any lighting, a signature lighting experience.

SUMMARY OF THE INVENTION

Some of the objects and advantages of the invention will now be set forth in the following description, while other objects and advantages of the invention may be obvious from the description or may be learned through practice of the invention.

Broadly speaking, a principle object of the present invention is to provide a luminous apparatus and method for providing lighting to an area while also providing an informational function which includes data and artistic functions when the luminous apparatus is on and off.

Yet another object of the invention is to provide a luminous apparatus that provides lighting to an area while also providing an informational function or artistic function where the informational or artistic function can be easily changed.

Yet another object of the invention is to provide a luminous apparatus that provides a signature lighting experience to an area while also providing an informational function or artistic function.

For one embodiment, a luminous apparatus is configured to provide an information function (e.g. words, art work, etc.) and a lighting function where the luminous light apparatus comprising an outer structure defining an outer polygonal perimeter (for this document a circle is a polygon) and comprising a back plate. For the disclosed embodiments, the outer perimeter is a square. The outer structure further defines a locking feature (e.g. side clamps) configured to releasably mechanically receive a luminous module. Notably, a "luminous module" can also be simple collections of components whether called a module or not.

The luminous module comprises an inner structure frame (ISF) defining a polygonal ISF-perimeter having a ISF-face area along said ISF-perimeter. Restated, one embodiment of an inner frame resembles a picture frame defining a polygonal void in the middle with a frame face running around the perimeter. The ISF-perimeter is similar and smaller than said OS-perimeter and suitably sized so that at least a portion of frame face can be releasably mechanically associated with the locking features. Restated, the outer frame perimeter has clamps that clamp to the inner frame face to secure it in place.

The luminous module further comprises a luminous panel (LP) defining an LP-perimeter that is similar but smaller than said OS-perimeter. The luminous panel defines at least one light-blocking region and at least one light-passing region such regions define a LP-design. A LP-design may be an art work or more informational in nature such as words. The light-passing region preferably defines a plurality of voids therethrough to create a signature lighting pattern.

The luminous module further comprises a light source (LS) disposed between the outer structure back plate the luminous panel. The light source comprises a light source panel defining a LS-perimeter that is one of (a) similar and smaller and (b) about equal to said LP-perimeter. Such a configuration allows the light source panel to be placed adjacent to the luminous panel so that light transmitted through the light source panel passes to and through the luminous panel. At least one light generator is associated with the peripheral edge of the light source panel and is configured for generating light.

In summary, the luminous panel is disposed adjacent to the inner structure frame so that their respective perimeters are in alignment. The light source panel is placed adjacent to the opposite side of the luminous panel (relative to the frame) and adjacent to the back plate and the components are clamped into the outer structure. The light levels emitted, and the signature lighting pattern created by the luminous apparatus can be controlled by varying the light generator intensity and selecting the number of voids and void sizes defined by the light-passing region. As noted above the Luminous Panel design conveys at least one of (a) an artistic design (art work) and (b) data (e.g. words) when said light source is on and off.

Additional objects and advantages of the present invention are set forth in the detailed description herein or will be apparent to those skilled in the art upon reviewing the detailed description. Also, it should be further appreciated that modifications and variations to the specifically illustrated, referenced, and discussed steps, or features hereof may be practiced in various uses and embodiments of this invention without departing from the spirit and scope thereof, by virtue of the present reference thereto. Such variations may include, but are not limited to, substitution of equivalent steps, referenced or discussed, and the functional, operational, or positional reversal of various features, steps, parts, or the like. Still further, it is to be understood that different embodiments, as well as different presently preferred embodiments, of this invention may include various combinations or configurations of presently disclosed features or elements, or their equivalents (including combinations of features or parts or configurations thereof not expressly shown in the figures or stated in the detailed description).

Those of ordinary skill in the art will better appreciate the features and aspects of such embodiments, and others, upon review of the remainder of the specification.

BRIEF DESCRIPTION OF THE DRAWINGS

A full and enabling description of the present subject matter, including the best mode thereof, directed to one of ordinary skill in the art, is set forth in the specification, which makes reference to the appended figures, in which.

Figure 1:
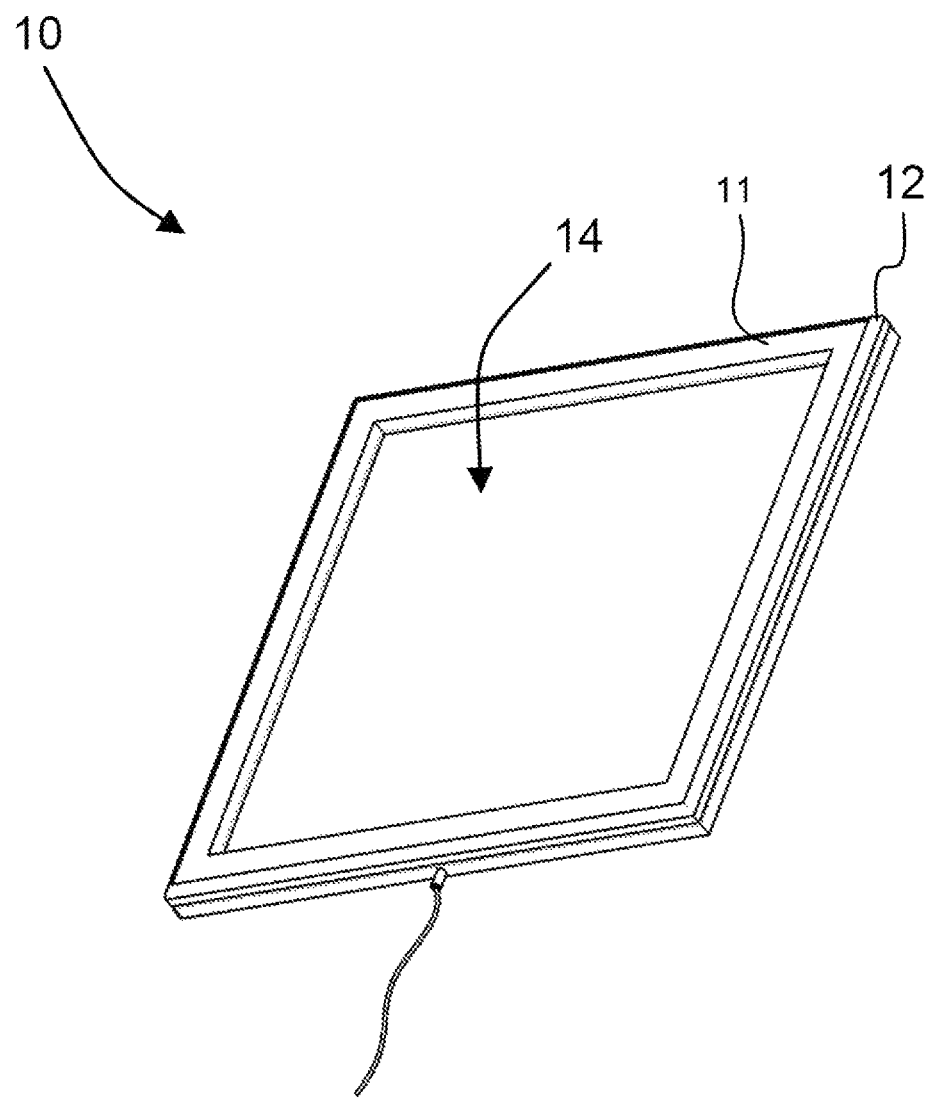
FIG. 1 is a perspective view of one exemplary embodiment of a luminous apparatus.

Repeat use of reference characters throughout the present specification and appended drawings is intended to represent the same or analogous features or elements of the present technology.

DISCLOSURE OF THE INVENTION

Detailed Description

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeat use of reference characters is intended to represent same or analogous features, elements or steps. It is to be understood by one of ordinary skill in the art that the present discussion is a description of exemplary embodiments only, and is not intended as limiting the broader aspects of the present invention.

Construction Aids

For the purposes of this document two or more items are "mechanically associated" by bringing them together or into relationship with each other in any number of ways including a direct or indirect physical "releasable connections" (snaps, screws, Velcro®, bolts, clamps, etc.—generally connections designed to be easily and frequently released and reconnected), "hard-connections" (welds, rivets, macular bonds, generally connections that one does not anticipate disconnecting very often if at all—a connection that is "broken" to separate), and/or "moveable connections" (rotating, pivoting, oscillating, etc.).

Similarly, two or more items are "electrically associated" by bringing them together or into relationship with each other in any number of ways including: (a) a direct, indirect or inductive communication connection, and (b) a direct/indirect or inductive power connection. Additionally, while the drawings may illustrate various electronic components of a system connected by a single line, it will be appreciated that such lines may represent one or more signal paths, power connections, electrical connections and/or cables as required by the embodiment of interest.

For the purposes of this document, unless otherwise stated, the phrase "at least one of A, B, and C" means there is at least one of A, or at least one of B, or at least one of C or any combination thereof (not one of A, and one of B, and one of C).

Any two polygons are similar if their corresponding angles are congruent and the measures of their corresponding sides are proportional. Similar polygons have the same shape, but can be different sizes. For the purpose of this document circles are polygons.

This document includes headers that are used for place markers only. Such headers are not meant to affect the construction of this document, do not in any way related to the meaning of this document nor should such headers be used for such purposes.

DESCRIPTION

While the particulars of the present invention and associated technology may be adapted for use for any type of lighting application, the examples discussed herein are primarily in the context of lighting devices associated with a wall or ceiling.

Referring now more particularly to FIG. 1-FIG. 6, various views of one exemplary embodiment of a Luminous Apparatus (LA) (10) is considered. The Luminous apparatus (10) is configured to provide an information function and a lighting function. An "information function" is simply an artistic design or (or perhaps combined with) a utilitarian message such as "Exit" (although the message could be nonsensical and perhaps useless). The information function is preferably provided when the luminous apparatus (10) is OFF (not emitting light) and ON (emitting light).

Figure 6:
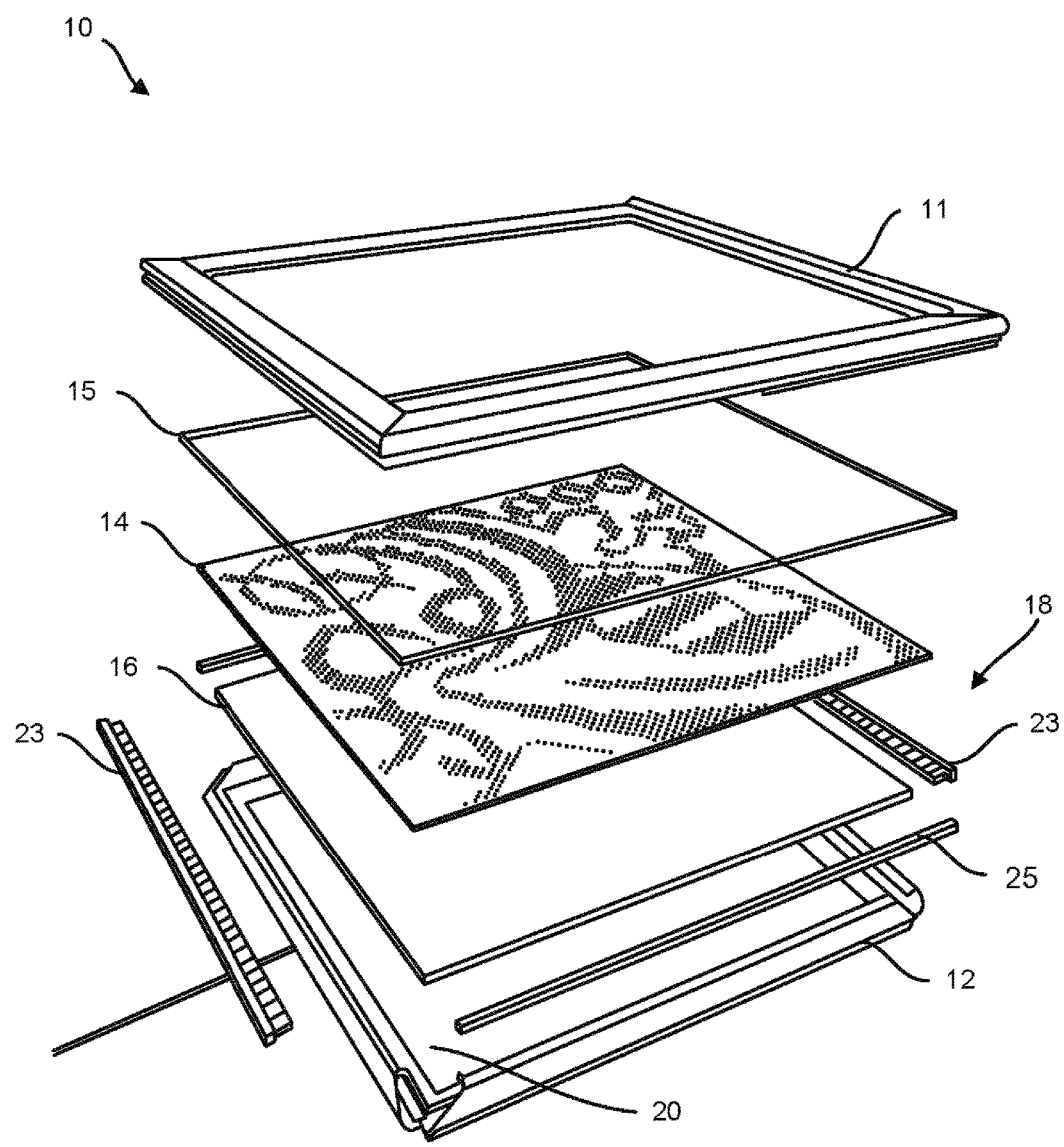
FIG. 6 is an exploded view of the Luminous apparatus depicted in FIG. 1.
Figure 7:
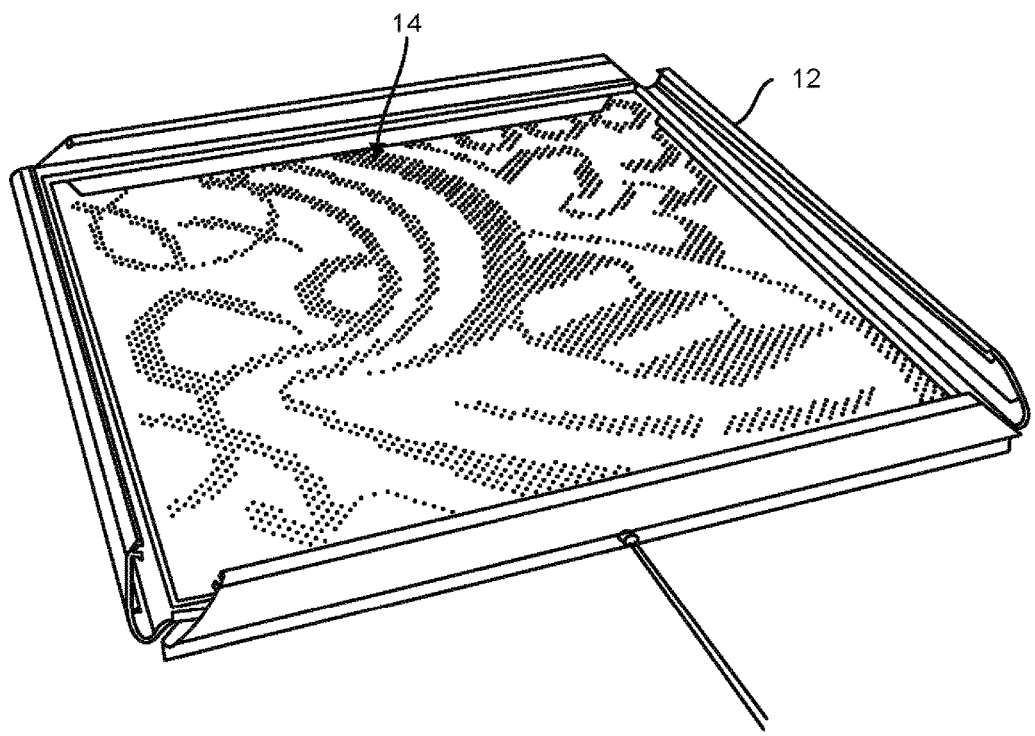
FIG. 7 is an elevated perspective view of an open outer frame and associated locking feature with the inner frame removed but showing a replaceable Luminous panel.

As best seen in FIG. 6, the LA (10) apparatus comprises an Outer Structure (12) defining a polygonal OS-perimeter. One exemplary embodiment of an outer structure (12) is a frame which may be constructed from a plurality of parts or define one integral piece. As best seen in FIG. 6 and FIG. 7, and as will be described in detail later, preferably the outer structure (12) defines a clamping frame. Such clamping frame defines a locking feature configured to releasably mechanically receive a "luminous module" (defined below). Notably, "luminous module" also covers a simple collection of components not specifically called a "module". The outer structure (12) further comprises a back plate (20) preferably configured to reflect light.

Figure 2:
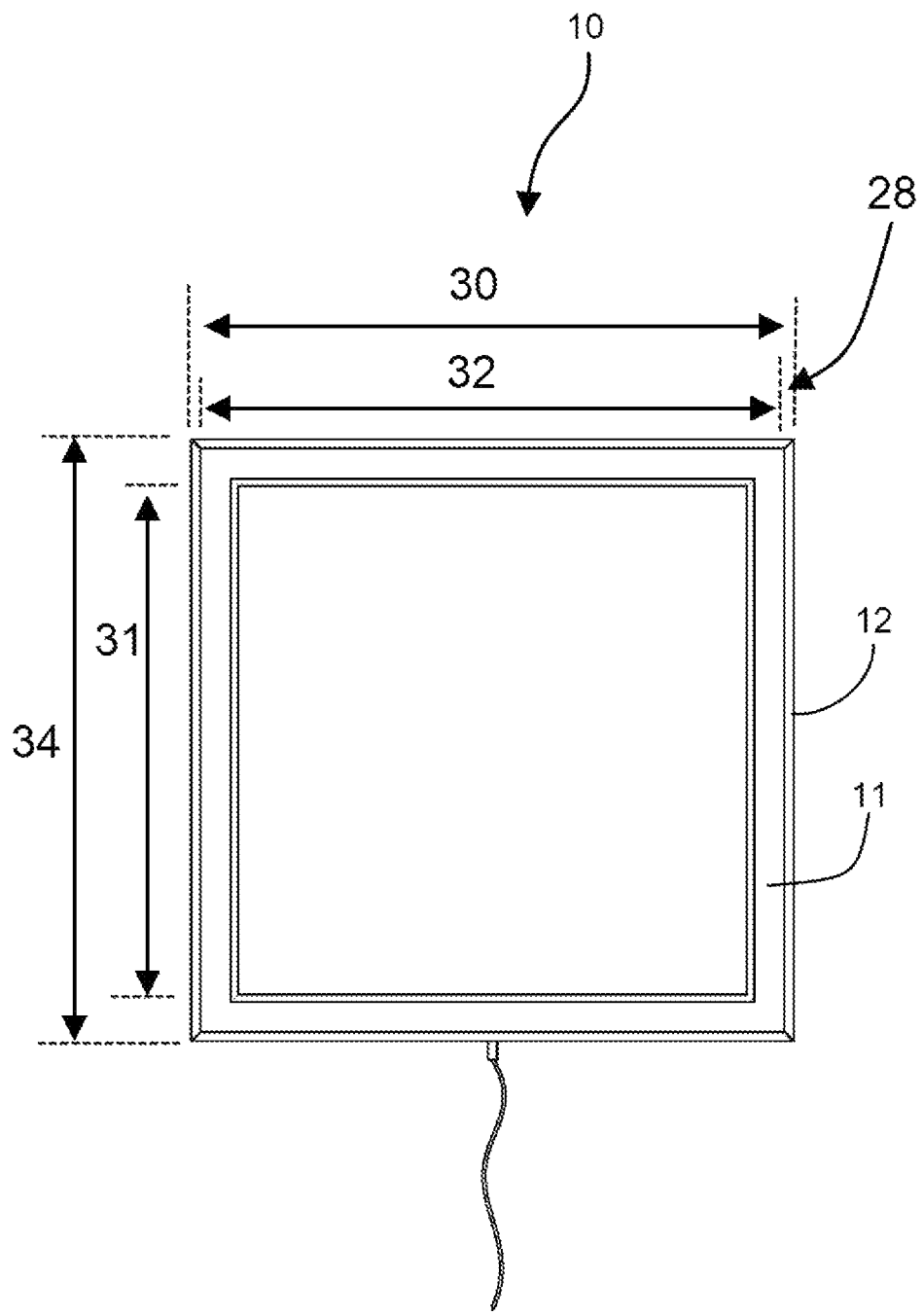
FIG. 2 is a front plan view of the Luminous apparatus depicted in FIG. 1.
Figure 3:
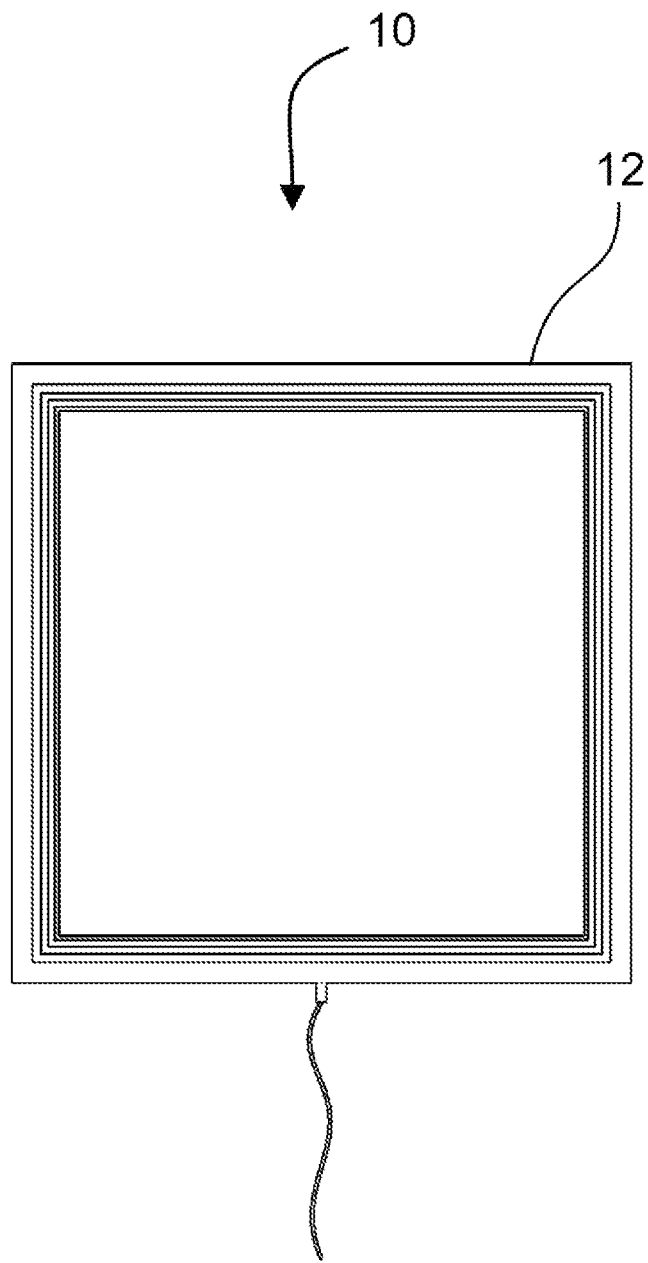
FIG. 3 is a back plan view of the Luminous apparatus depicted in FIG. 1.
Figure 4:
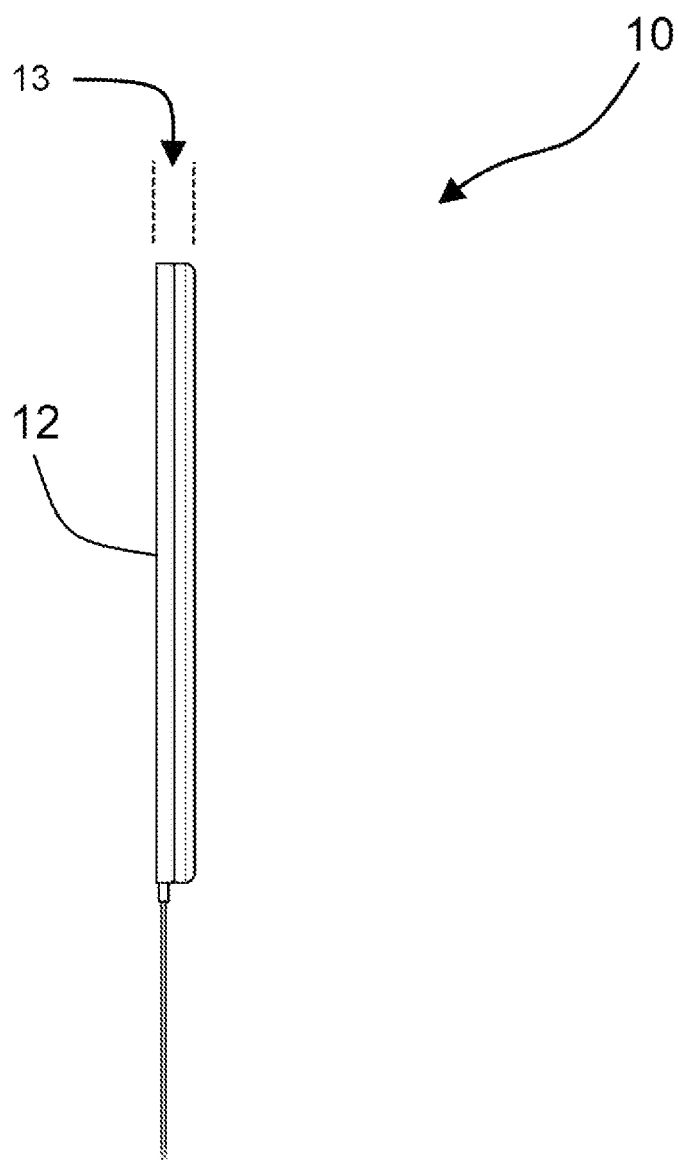
FIG. 4 is a side elevation view of the Luminous apparatus depicted in FIG. 1.

As best seen in FIG. 2, for the currently preferred embodiment, the OS-perimeter defines a square defining an OS-outside width (30) and an OS-perimeter length (34) and an OS-inside width (32) and an OS-inside length (31). As one example, when the clamping feature is actuated and clamping a luminous module as depicted in FIG. 2, the OS-outside width (30) and the OS-outside length (34) are each about 324 mm (i.e. square). The OS-inside width (32) and the OS-inside length (31) are about 317 mm (i.e. square) creating about a 7 mm face/border region (28).

Unless otherwise stated, in this document, the term "about" means a tolerance of plus/minus 10%.

Referring now to the luminous module as depicted in FIG. 6, for the current embodiment, the luminous module comprises an inner structure (11), an optional shield (15), a luminous panel (14), and a light source (18) comprising light panel (16) associated with light generators (23). While such components are described as a "module" they could be considered as individual components. Preferably, the light source (18) is placed adjacent to the back plate (20) and the luminous panel (14) is placed adjacent to the light source (18) and the shield (15) is placed adjacent to the luminous panel (14) and the inner structure (11) is placed adjacent to the shield (15) so that the edges of the various panels are in alignment. The locking feature (e.g. frame clamp) is actuated to secure the luminous module together and within the outer structure (12) to define the Luminous Apparatus (10) device as depicted in FIG. 1 through FIG. 4 (although without showing the "information function"). For the currently preferred embodiment, the LA (10) depth (or thickness) (13, FIG. 4) is ideally around 20 mm.

Figure 8:
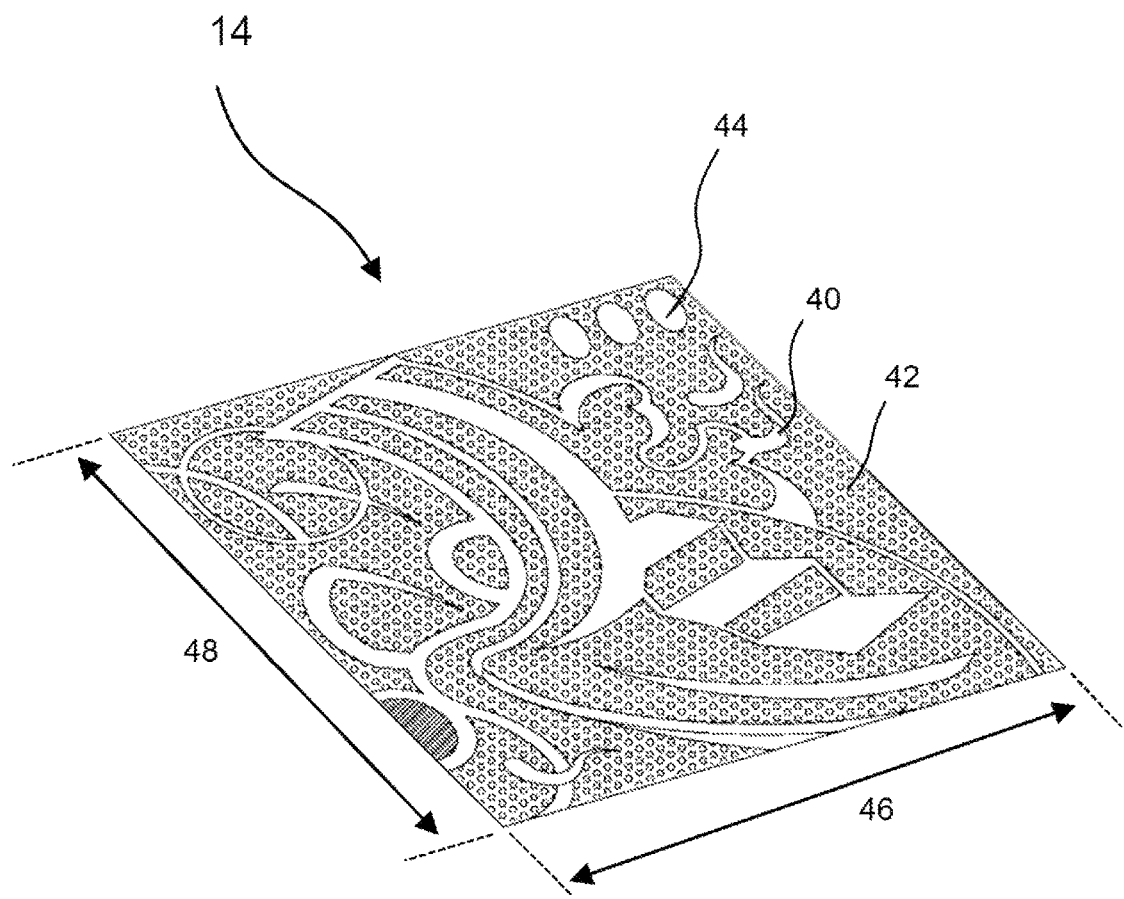
FIG. 8 is an elevated perspective view of one preferred embodiment of an Luminous panel.

Referring now to FIG. 8, the luminous panel (14) defines a generally flat surface further defining a polygonal LP-perimeter similar to but smaller than the OS-perimeter. The LP (14) defines at least one light-blocking region (40) and at least one light-passing region (42). As seen in FIG. 8, the light-blocking region (40) and the light-passing passing region (42) define a LP-design. For the preferred embodiment, the light-passing region (42) defines a plurality of voids (holes) that allow light generated by the light source (18) to pass through and out of the LP (14). Continuing with the above example, the LP (14) defines a LP-width (46) of 310 mm and a LP-length (48) of 310 mm (i.e. a square). The LP (14) may optionally define a LP-border region (between about 10 mm to about 18 mm) around the perimeter of the LP (14).

For the current embodiment, for LP (14) depicted in FIG. 8, the light-blocking region (40) and the light-passing region (42) define a flat surface and the design is configured to define an artistic function that allows light to pass through to create a signature lighting experience. Restated, each artistic design will create a unique/signature lighting experience.

Figure 9:
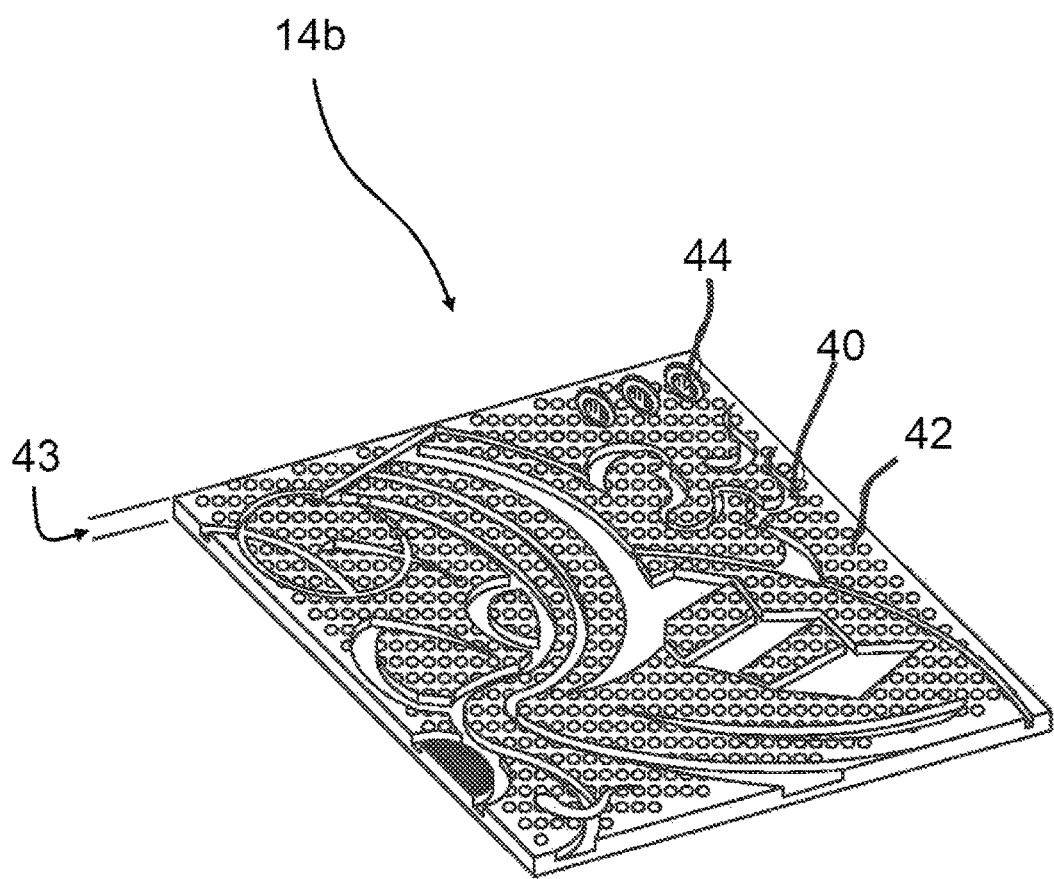
FIG. 9 is an elevated perspective view of one alternative embodiment of a non-flat Luminous panel.
Figure 10:
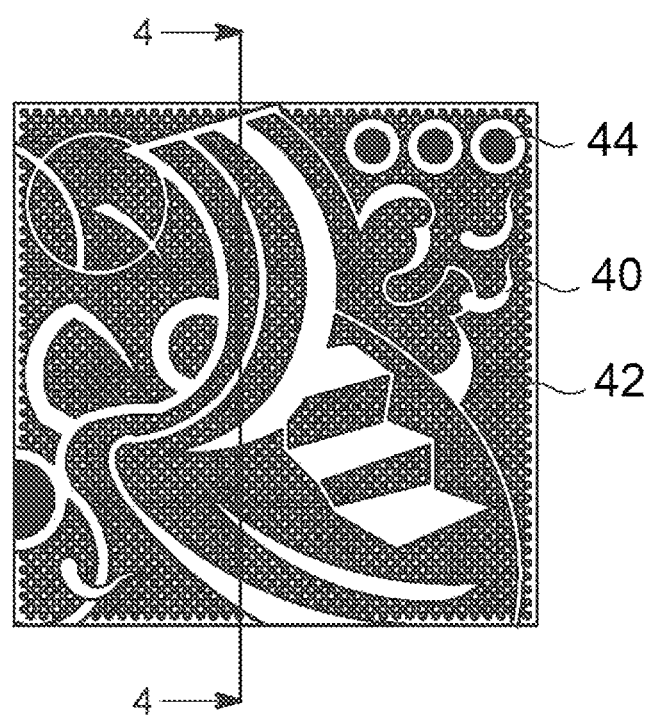
FIG. 10 is a top plan view of the alternative embodiment of the Luminous panel depicted in FIG. 9.
Figure 11:
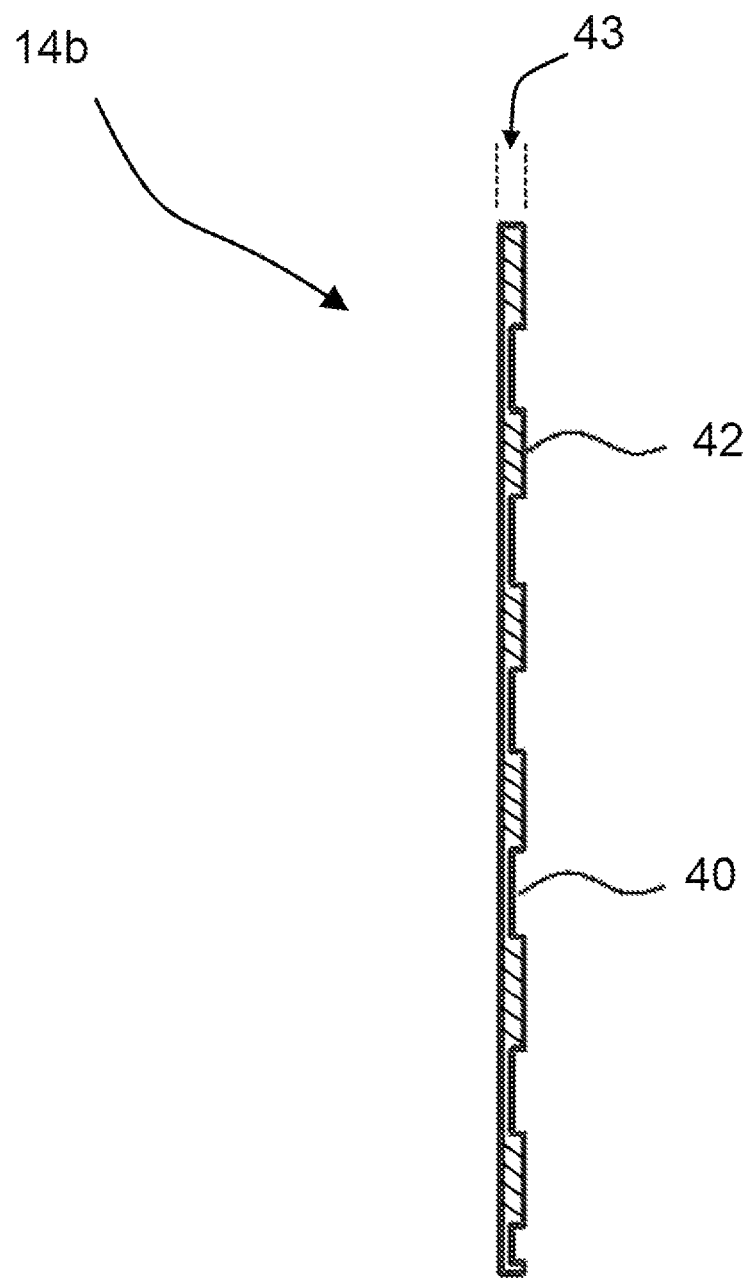
FIG. 11 is a side elevation view of the Luminous panel depicted in FIG. 10 from perspective 4.
Figure 12:
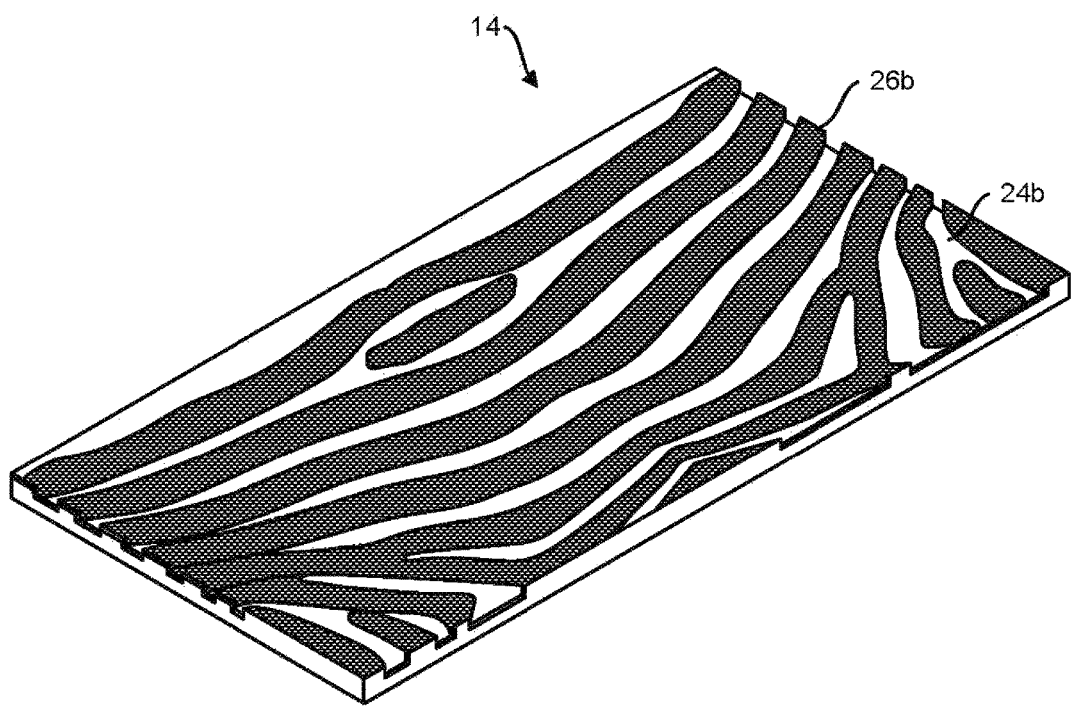
FIG. 12 is an elevated perspective view of another alternative view of a non-flat Luminous panel having a different design and perimeter shape.
Figure 13:
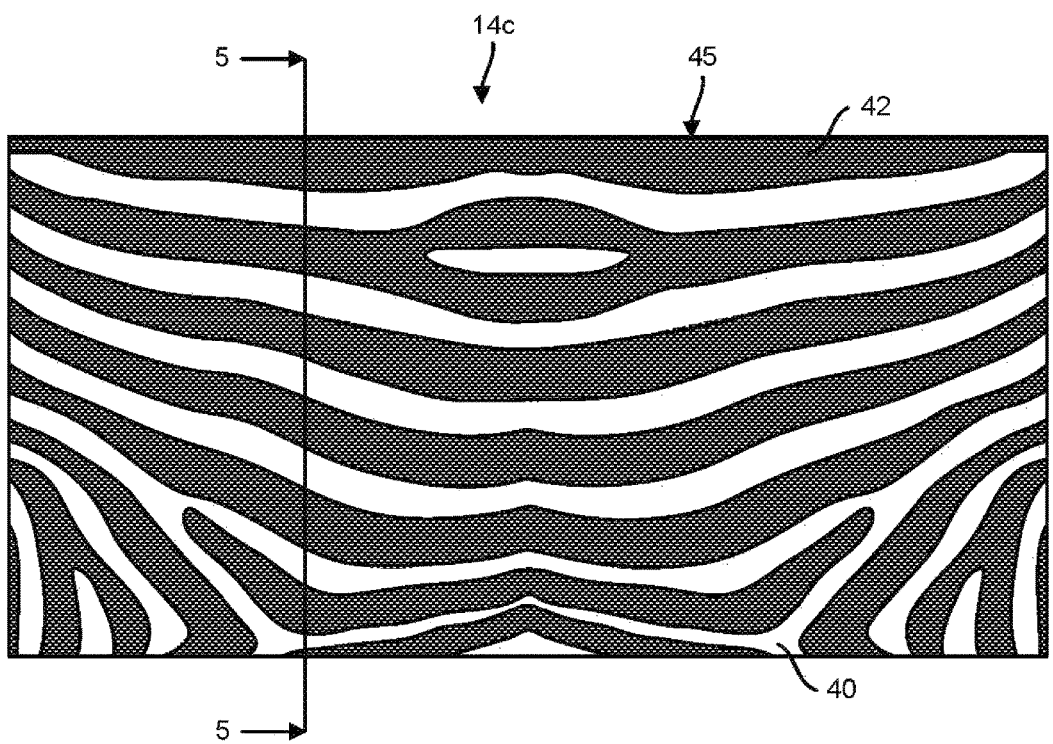
FIG. 13 is a top plan view of the Luminous panel depicted in FIG. 12.
Figure 14:
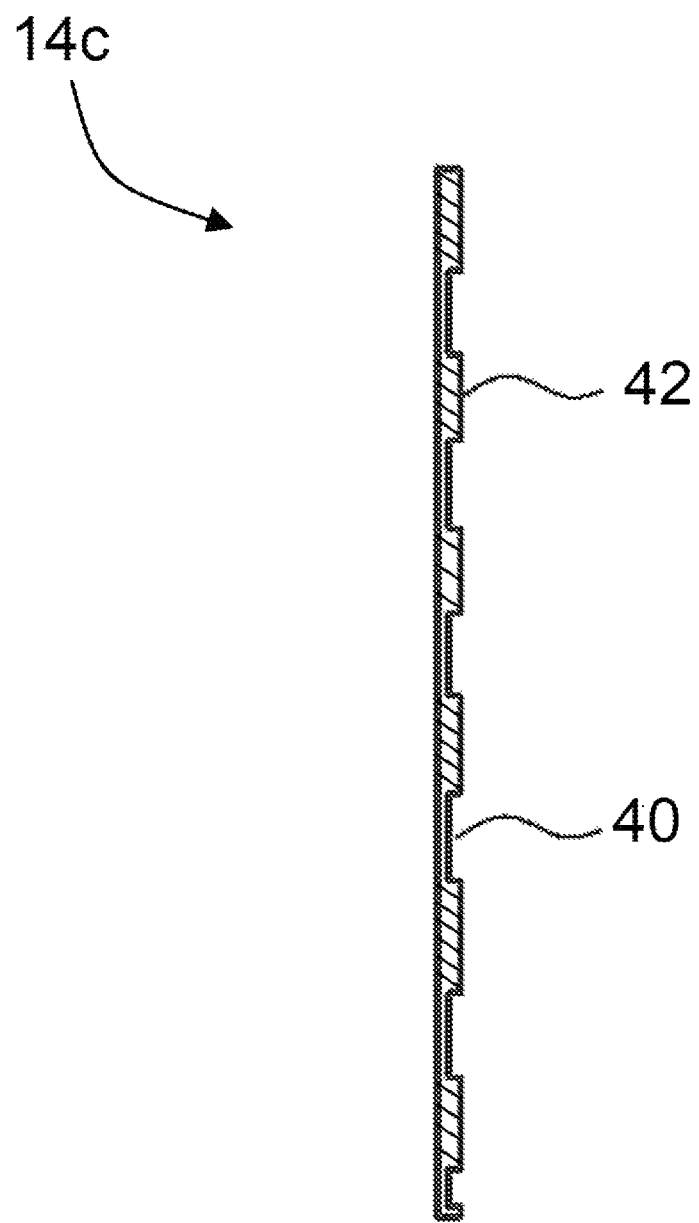
FIG. 14 is a side elevation view of the Luminous panel depicted in FIG. 13 from perspective 7.
Figure 15:
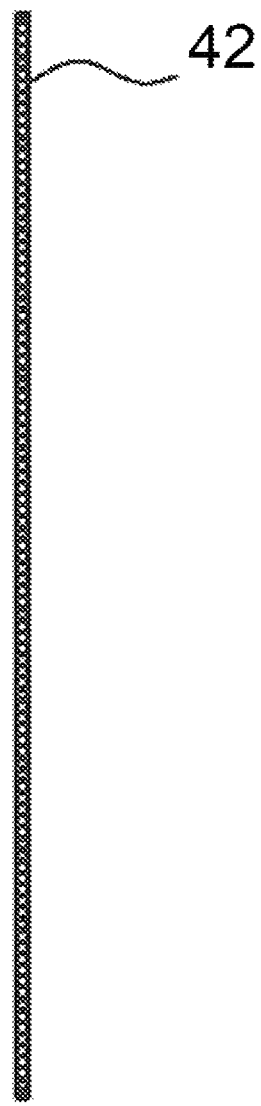
FIG. 15 is a side elevation view of an Luminous apparatus panel having continuous perforations.

As depicted in FIG. 9 through FIG. 11, for one alternative embodiment, the LP (14b) has an LP-thickness (43) wherein the light-passing region (42) defines a raised region compared to the light-blocking region (40). Similarly, as depicted in FIG. 12-FIG. 15, another embodiment of the LP (14c) is provided where the light-passing region (42) defines a raised region compared to the light-blocking region (40). Notably, such configuration can be reversed so that the light-passing region (42) defines a lower region compared to the light-blocking region (40) as well as a combination of the two. For yet another alternative embodiment, a light-passing region may be defined by a light transparent material and not use voids or a combination of transparent material and voids may be used as well as embodiments where there is no "light-blocking region" but just regions of different levels of light transmittance. It should be appreciated that such features of the LP (14) embodiment apply to the LP (14b) and LP (14c) embodiments.

Referring to the light-passing region (42), the voids are round holes. That said, one of ordinary skill in the art will appreciate that any type/shape of void falls within the scope and spirit of the present invention. The Luminous Panel (14) can be of any suitable size and for the examples used in the currently preferred embodiment the Luminous-Panel (14) side length is 310 mm. The void size (diameter) will be between about 0.15% to about 3.2% of the length of the longest side of the LP-perimeter. Thus, typically, the void/hole sizes are between about 0.05 mm to about 10 mm depending on the size of the overall LA (10) device. For the exemplary embodiment depicted in FIG. 8, the LP (14) perimeter defines a square having sides of about 310 mm in length with the voids all being the same size of 3 mm (or 0.97% (3 mm/310 mm=0.0097) of the longest side). Notably, it is not required for the voids to be identical in size.

For preferred embodiments, the LP (14) defines a precisely manufactured perforated geometric 2 or 3-dimensional shaped pattern (repeating and/or random) which may further act as a patterned light diffuser. Preferably, such Luminous apparatus panels provide an artistic work (or informational work) whether or not the system is suppling light. When the device is suppling light, the luminous apparatus panel is preferably not only an art work, but it also supplies a predefined designer lighting experience replacing typical prior art lighting devices for the area of interest.

As described above, the LP (14) is placed between a light source and the area to be illuminated to provide a low glare, easy on-the-eyes lighting atmosphere. For one embodiment, the LP (14) is simply used as a window (e.g. in a door or a wall) with a star (sun, for example) being the light source making the LP (14) a designer diffuser. As best seen in FIG. 7, the LP (14) defines a predefined pattern comprising at least one of (a) open/hallow portions (44), (b) non-perforated portions (40) and (c) perforated portions (42). Such predefined pattern defines a signature light pattern by using different geometric forms (e.g. circular, triangular shapes, etc.) for the perforated portions (42) and different designs for the non-perforated portions (40).

For the preferred embodiment, the perforation portion (42) ranges from 50% to 100% of the predefined pattern to create a diffused light screen. One of ordinary skill in the art will appreciate that the amount of light transmitted by the LA (10) apparatus may be controlled using various combinations of perforation portions (42) and non-perforation portions (40) and varying the intensity of an associated light generator.

The LP (14) can be made of any suitable material such as wood, metal (stainless steel, galvanized iron, brass, copper, aluminum, or other metal/alloy wire or gold plated as perforation or cutouts), acrylic materials, glass or Plexiglas (translucent) materials that allow light and/or air to be transmitted. Paint colors, textures and other finishes can be added to final surface for additional dramatic enhancement. The LP (14) cover/plate/panel can be made in many types of molds including electroformed mold and molds for foaming beads of polystyrene, polypropylene, or modified polyphenylene ether, a screen mold for preforming glass fiber, and a mold for making a molded resin product by vacuum, blow, stamping, injection, RIM urethane, or compression molding. Additionally, the LP (14) can be made in through punch techniques allowing the selected pattern to be stamped or cut out to achieve the desired pattern.

Figure 5:
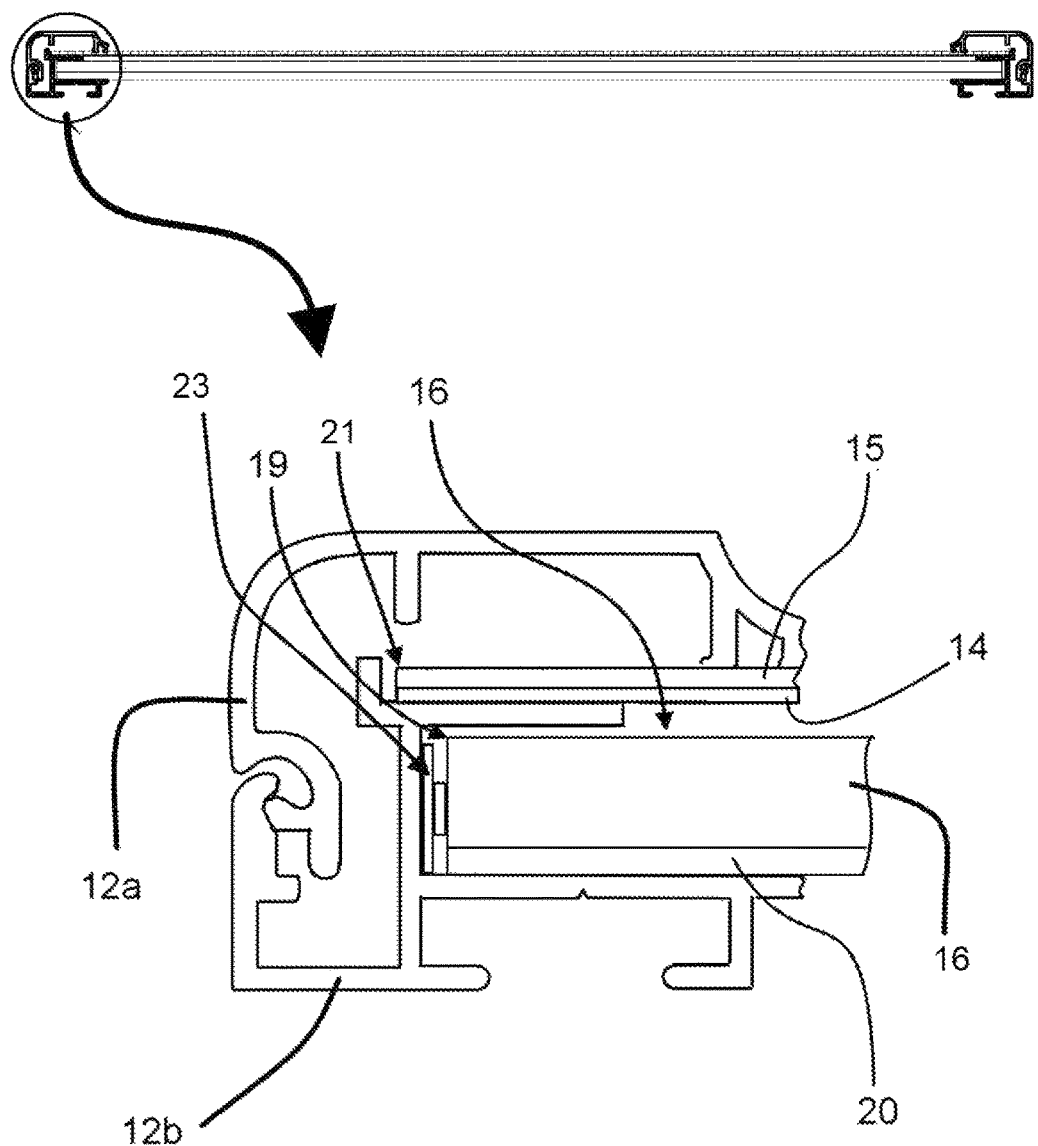
FIG. 5 depicts a section of the Luminous apparatus showing the association between the framing and panel components.

Referring to FIG. 6, one exemplary embodiment of a light source (18) is considered in more detail. For the current embodiment, the light source (18) comprises a LS-panel (16), at least one light generator (23), and at least one light rail (25). The light rail (25) preferably provides structural functions and an electrical association between the two light generators (23) where there is more than one light generator. One embodiment of an LS-Panel (16) is a light-distributor. The LS-panel (16) defines a LS-perimeter that is one of (a) similar and smaller and (b) about equal to said LP-perimeter. Restated, for the above examples, the LS-panel (16) perimeter defines a square where the length of the sides are about 300 mm (i.e. similar to or smaller than the lengths of LP (14) perimeter sides). Such side lengths are slightly less than the LP (14) sides although the LS-Panel (16) could be larger if desired. As depicted in FIG. 5, the light-panel end (19) falls short of the LP (14) end (21). Consequently, while the perimeter defined by the light-panel (18) defines a similar polygon compared to the LP (14) (i.e. they both define squares for the current example) the light-panel perimeter is about the same size as the LP-perimeter but smaller. For one embodiment, the Light-panel (16) perimeter is substantially equal to the perimeter of the back plate (20). Substantially equal simply means the two are equal within normal manufacturing tolerances (say +/−5%).

The light source (18) is configured for generating light that propagates through the light-passing region (42). The preferred light source is a low power consumption device such as Light Emitting Diodes (LED) associated with a module that provides for wireless control. Such electronic modules are well known in the art and a detailed description thereof is not necessary for providing an enabling description.

Where the light source comprises LEDs, there are a variety of different LED specifications to consider which are selected to help create the signature designer lighting atmosphere desired. Color is one important LED specification consideration. The LED color is generally specified by its wavelength typically measured in nanometers (nm). Another LED parameter to consider is its intensity usually quantified using units of millicandela (MCD) although normally indicated by the amount of luminous flux (Lumens) which is, generally, viewing angle dependent. Notably, LED intensity is a function of current (although other factors come into play such a chip material and encapsulation).

As noted above, the LED outputs can be varied to vary the light output of the LA (10) device. Also, the voids defining the perforated portion (42) may be sized to be a multiple (harmonic) of the fundamental frequency for the wavelength of light one wishes the LA (10) device to generate to enhance light propagation.

Preferably, the LA (10) device is connected to a typical power mains (e.g. 120 Vac or 220 Vac) via a converter. The converter is preferably disposed outside the LA (10) device so that the cord suppling power to the IA (10) device is a low current low voltage cord (i.e. much smaller than a typical power cord) thereby making such cord less visible. For yet another embodiment, the LA (10) device would be associated with a surface where the external power source is adjacent to the back of the IA (10) device so that no power cord is visible once the LA (10) device is installed.

The LA (10) device may also be battery powered or contain a battery backup that is charged when AC power is available. When there is a power failure the battery backup powers the LA (10) device which may be placed in a lower power consumption mode to extend battery life. One "trick" is to distinguish between a power failure and someone simply turning off the light using a well-known prior art light switch. One method to make such a distinction is to connect the LA (10) power cord to a non-switched power source such as a typical wall outlet and only used a remote control to cycle (turn off and on) the LA (10) device. Under such configuration, if power is removed from the LA (10) device without the device having received a power off signal from the remote control, such power loss is due to a power failure. Alternatively, the input impedance of the power source that the LA (10) device is plugged into can be examined. If power fails when the LA (10) device is powered on, and the LA (10) power source is connected to a switched circuit, the light switch would be closed and providing lower than infinite impedance (open circuit gives infinite impedance and a light switch is "open" when the light should be off). Thus, if there is no power being supplied to the LA (10) device, and the input impedance is less than infinite, there has been a power failure.

Figure 18:
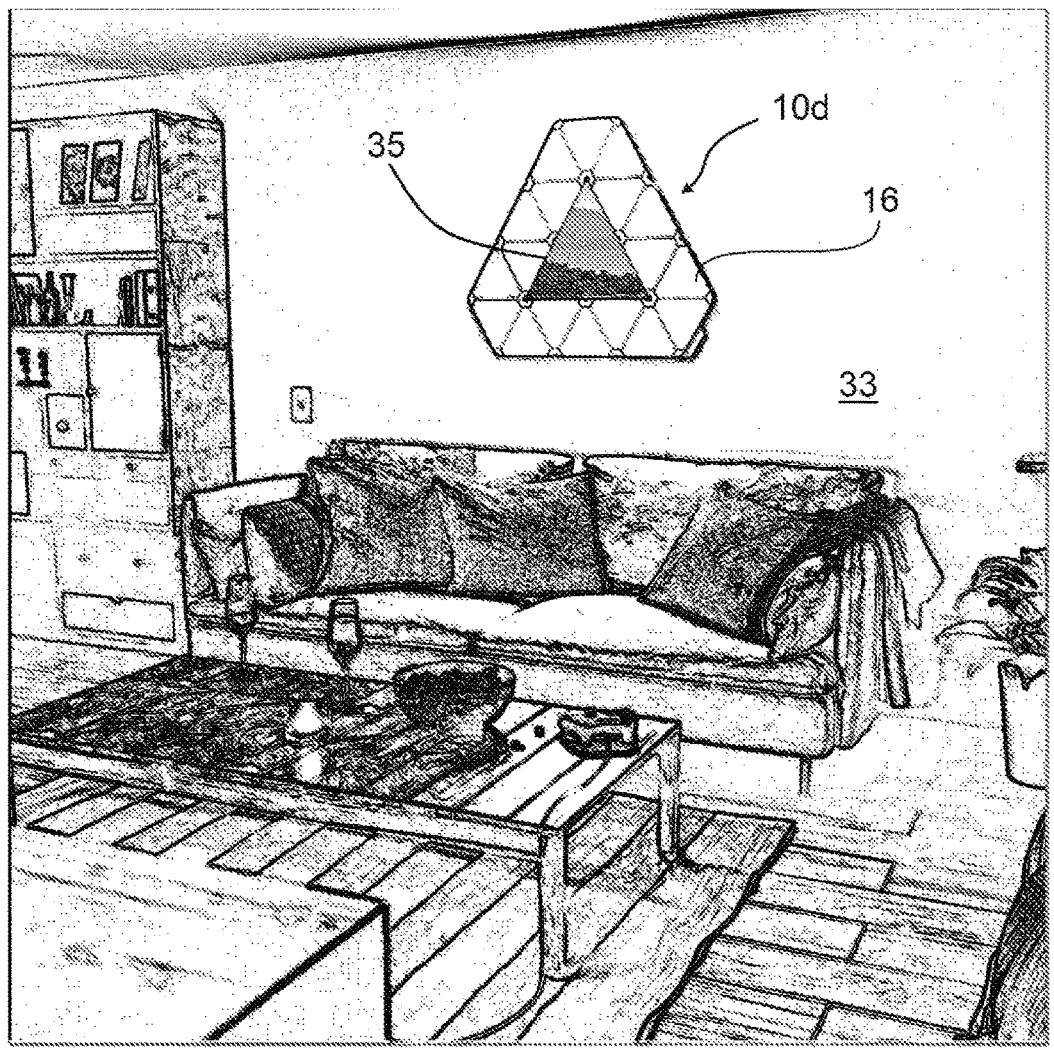
FIG. 18 is one exemplary Luminous Apparatus defining a geometric figure.
Figure 19:
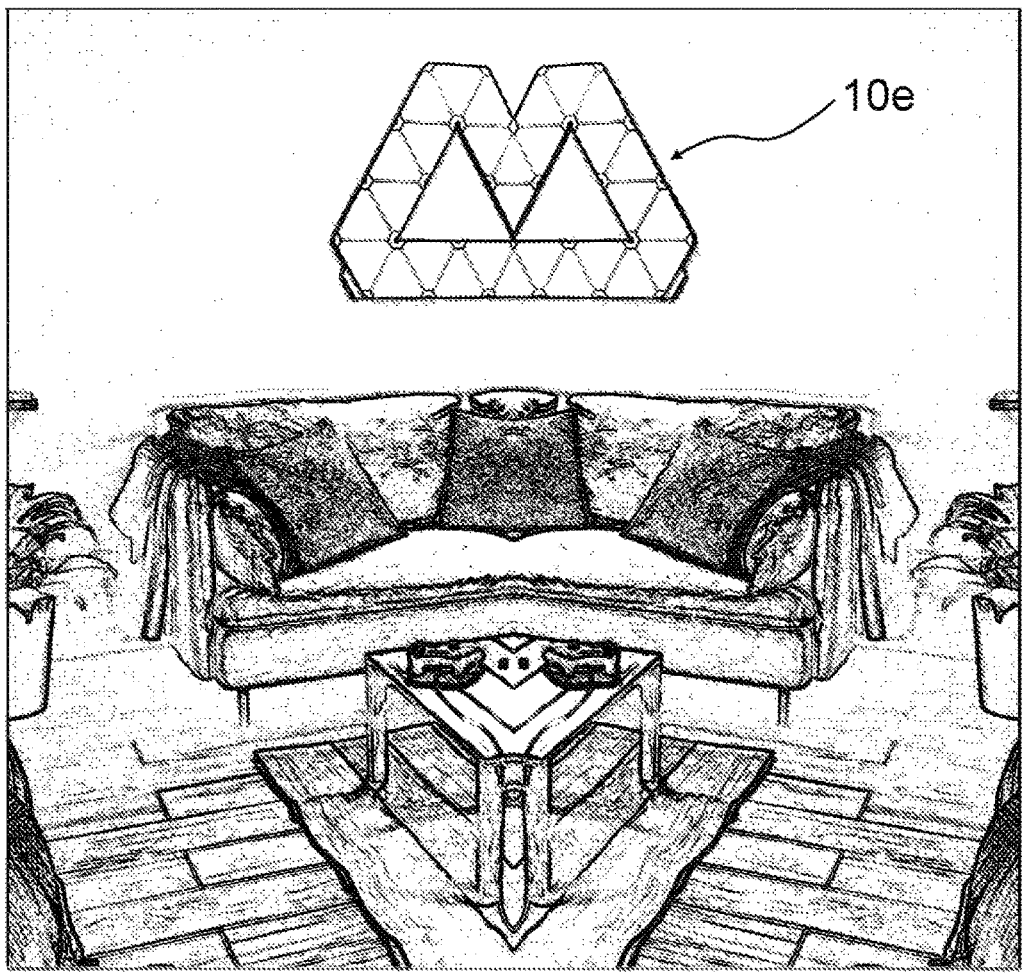
FIG. 19 is one exemplary Luminous Apparatus defining a second geometric figure.

Geometric Shapes and Interconnections Referring now to FIG. 18 and FIG. 19, embodiments where the LA (10) device defines various geometric shapes are considered. As depicted in FIG. 18, the LA (10*d*) device is comprised of a plurality of modules interconnected to define a triangle.

Such a configuration could be constructed using an integral design or using a plurality of interconnected panels. For one embodiment, the LA (10d) device is hung on a wall in the same way any work of art or picture would be hung.

For one embodiment, the LA (10d) device defines an illumination window allowing viewing to an area outside of the room (33). For one exemplary embodiment, section (35) defines a luminous panel diffuser allowing disused sun light into room (33) during the day creating a first signature lighting experience and where luminous panel (16) generates a second signature lighting experience when turned on at night. For one embodiment, section (35) may simply define a common prior art window glass.

Where the LA (10d) device defines an illuminated window as described above, the back side of the luminous panels (16) may further be constructed from solar panels connected to energy storage devices (such as batteries) electrically associated with the light generators. Such energy storages devices may be integral to the LA (10d) device or stored remotely from the LA (10d) device. Such energy storage devices would charge during the day and then supply power to the light generators (23) during low light hours (e.g. night) providing for a more environmentally friendly LA (10) device. When the power stores of such energy storage devices are depleted the LA (10d) device would preferably automatically switch over to the typical power mains power source as defined above.

Technology such as solar panels and charging batteries with solar panels is well known in there are and there are numerous ways to accomplish such features. A detailed description thereof is not necessary for an enabling disclosure. What is considered novel is providing luminous windows (as defined above) with or without solar powered options.

Referring now to FIG. 19, the LA (10e) shows another configuration where the LA (10e) devices makes the shape of an underlined letter "M". Thus, for one embodiment, the LA (10e) device defines a panel block configured to be connected to other panel blocks to define a desired design such as a logo or a name. The interconnected panel blocks can be self-contained (i.e. have their own power source) or dependent on power supplied by an adjacent panel through an interconnected power buss. Technology for interconnecting such panel blocks is well known in the art and a detailed description thereof is not necessary for providing an enabling disclosure.

Fabrication Methods

Figure 16:
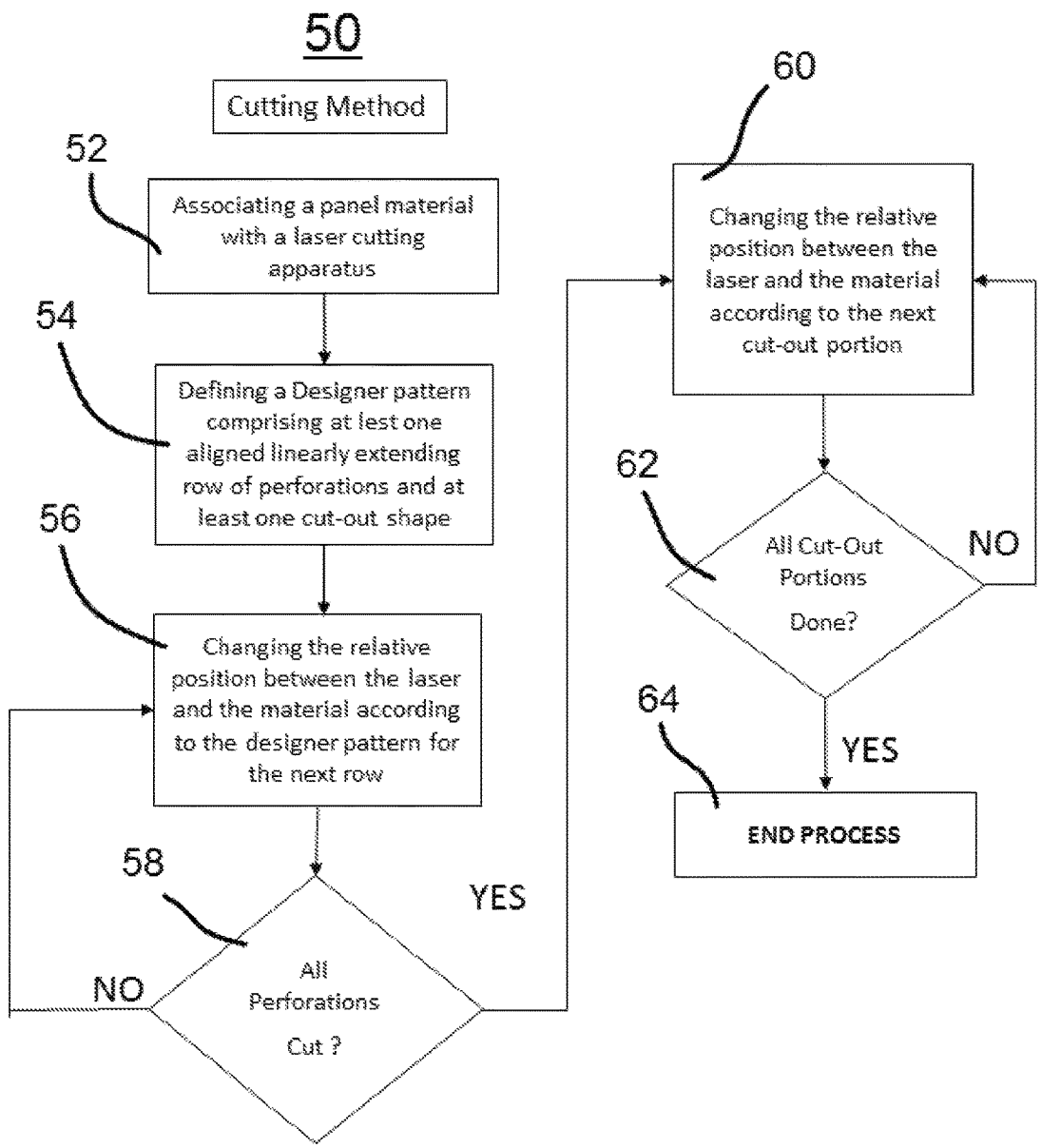
FIG. 16 is one exemplary Luminous apparatus panel cutting method.
Figure 17:
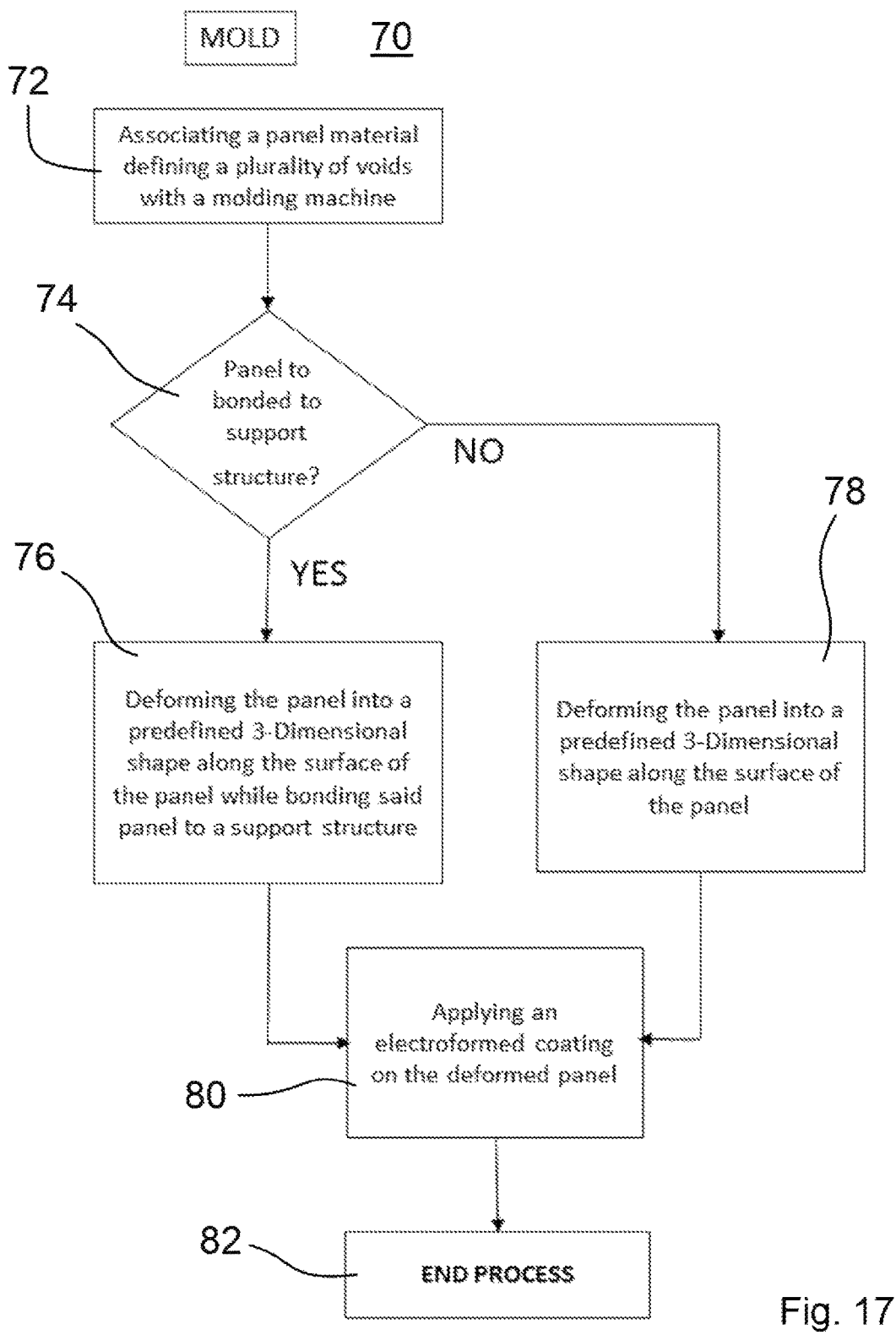
FIG. 17 is one exemplary Luminous apparatus panel molding process.

Referring now to FIG. 16 and FIG. 17, methods for manufacturing and fabricating an LP (14) are considered in more detail. There are at least two methods for manufacturing LP (14) devices that employ two fundamental techniques: (a) cutting and (b) molding. Referring now to FIG. 16, one exemplary method (50) for laser cutting a LP (14) device is considered. The first step (52) in the currently preferred embodiment is to associate a blank panel material with a laser cutting apparatus. Laser cutters are well known in the art. The blank panel may be made of any suitable material (as described earlier) such as metal or acrylic (Plexiglass). At step (54) a predefined LP-Design designer pattern is programmed into a computer that controls the laser cutter. Such LP-Design designer pattern preferably comprises at least one aliened, linearly extending, row of perforations (26) that is to define a perforated portion (26) for the design of interest. Similarly, the LP-Design design preferably comprises at least one "cut-out" shape that is to define the non-perforated portion (24). For the cutting step (56) at least one of the panel material and the laser is moved according to the LP-Design design for the first row of aliened and linearly extending row of perforations and a void cut at each peroated point. If there are more perforations to cut, process control pass back to the cutting step (56) and the next perforations are cut as before.

If all perforations have been cut, process control passes to the next step (60) where the non-perforations section are cut (if the non-perforations are to be cut). For one embodiment, the non-perforations sections are not cut. As before, at least one of the panel material and the laser is moved according to the LP-Design design for the first cut-out shape to define the first non-perforation section. If there are more non-perforations sections to cut (62), process control pass back to the cutting step (60) and the next non-perforation section is cut as before. If all non-perforations have been cut, the process ends (64).

Referring now to FIG. 17, an exemplary molding process (70) is presented. As before, a mold defining an LP-Design design is created. At step (72) a panel material defining a plurality of voids is associated with a molding machine. At step (76) the panel is deformed into a 3-Dimensional shape and bonded to a support structure. Alternatively, no support structure is used at step (78). A coating is applied at step (80) and the process ends.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A luminous apparatus configured to provide an information function and a lighting function, said luminous apparatus comprising:

an outer structure (OS) defining a polygonal OS-perimeter and defining a back plate, said outer structure further defining a locking feature comprising a plurality of clamps along the OS-perimeter configured to releasably mechanically receive a luminous module comprising:

an inner structure frame (ISF) defining a polygonal ISF-perimeter having a ISF-face area along said ISF-perimeter wherein the ISF-perimeter is similar and smaller than said OS-perimeter and suitably sized so that at least a portion of said ISF-face area is releasably mechanically associated with said locking feature;

a luminous panel (LP) defining an LP-perimeter that is similar but smaller than said OS-perimeter, said LP comprising at least one light-blocking region and at least one light-passing region wherein said light-blocking region and said light-passing region define a LP-design and wherein said light-passing region defines a plurality of voids therethrough;

a light source (LS) disposed between said back plate and said luminous panel, said light source comprising a LS-panel defining a LS-perimeter that is one of (a) similar and smaller and (b) about equal to said LP-perimeter, and wherein at least one light generator is configured for generating light that propagates through said light-passing region and to and through said luminous panel; and wherein said luminous panel is disposed adjacent to said inner structure frame so that their respective perimeters are in alignment and wherein said light source intensity and said plurality of voids are selected to provide a predefined level of light and wherein said LP-design conveys at least one of (a) an artistic design and (b) data when said light source is on and off.

2. A luminous apparatus as in claim 1, wherein said luminous panel further defines a light diffuser and wherein at least one void from said plurality of voids is sized to be a harmonic multiple of the fundamental frequency for the wavelength of light generated by said at least one light generator.

3. A luminous apparatus as in claim 2, wherein said light source (LS) comprises a transparent light-distributor panel defining a perimeter that is similar to said LP-perimeter wherein at least one light generator is associated with at least one edge defined by said light-distributor panel and wherein the light propagating from said light generator is evenly distributed about the upper face of the light distributor.

4. A luminous apparatus as in claim 3, wherein the luminous efficiency of said light-distributor panel is between about 80% to about 85% and provides a light uniformity of about 90%.

5. A luminous apparatus as in claim 2, wherein said each of said plurality of voids defines a perforation between 0.05 mm and 10 mm in size.

6. A luminous apparatus as in claim 5, wherein in the ISF-perimeter defines a square having sides of about 324 mm in length and wherein said ISF-face area is about 18 mm in width and wherein the LP-perimeter defines a square having sides of about 310 mm in length and where said perforation are between about 0.465 mm to about 10 mm in diameter.

7. A luminous apparatus as in claim 2, wherein said each of said plurality of voids defines a perforation between about 0.15% to about 3.5% of the length of the longest side of said LP-perimeter.

8. A luminous apparatus as in claim 7, further comprising a light transparent shield disposed between said inner structure frame and said luminous panel wherein said shield defines an outer perimeter that is one of similar and equal to said LP-perimeter.

9. A method of providing a luminous apparatus configured to provide a lighting function and a changeable information function, said method comprising the steps of:
providing an outer structure (OS) comprising a back panel and further defining an OS outer perimeter and a locking feature configured to releasably mechanically receive an inner frame, a luminous panel and a light source panel;
providing an inner frame (IF) defining an IF outer perimeter that is similar but smaller than said OS outer perimeter and further defining an IF-face area that is releasably mechanically associated with said locking feature when said locking feature is actuated;
providing a luminous panel (LP) disposed adjacent to said inner frame and defining an LP-perimeter that is similar but smaller than said OS-perimeter, said LP comprising at least one light-blocking region and at least one light-passing region wherein said light-blocking region and said light-passing region define a LP-design and wherein said light-passing region defines a plurality of voids therethrough;
providing a light source panel (LS-panel) disposed between said back panel and said luminous panel, said LS-panel defining a LS-perimeter that is one of (a) similar and smaller and (b) about equal to said LP-perimeter and disposing said luminous panel adjacent to said inner structure frame so that their respective perimeters are in alignment and disposing said LS-panel adjacent to said luminous panel so that their respective perimeters are in alignment and disposing said LS-panel adjacent to said back panel so that their respective perimeters are in alignment;
providing at least one light generator associated with at least one edge of said LS-panel and configured for generating light that propagates through said LS-panel and to and through said light-passing region and wherein the light source intensity, said LS-panel transmittance value and the size and number of said plurality of voids are selected to provide a predefined level of light and wherein said LP-design conveys at least one of (a) an artistic design and (b) data when said light source is on and off.

10. A method of providing a luminous apparatus as in claim 9, wherein said luminous panel further defines a light diffuser.

11. A method of providing a luminous apparatus as in claim 10, wherein the light propagating from said light generator is evenly distributed about the surface of said LS-panel and wherein the intensity of said light source is variable over a plurality of intensity values.

12. A method of providing a luminous apparatus as in claim 11, wherein the luminous efficiency of said LS-panel is between about 80% to about 85% and provides a light uniformity of about 90%.

13. A method of providing a luminous apparatus as in claim 10, wherein said each of said plurality of voids defines a perforation between 0.05 mm and 10 mm is size.

14. A method of providing a luminous apparatus as in claim 10, wherein each of said plurality of voids defines a perforation between about 0.15% to about 5% of the length of the longest side of said LP-perimeter.

15. A method of providing a luminous apparatus as in claim 14, further comprising the steps of providing a light transparent shield disposed between said inner frame and said luminous panel.

16. A luminous apparatus comprising:
an outer structure comprising a back plate and defining clamping elements along the perimeter of said outer structure configured to releasably receive a luminous module;
a luminous module comprising:
  a. inner structure frame defining a face region along its perimeter configured to receive said clamping elements;
  b. a luminous panel disposed between said inner structure frame and said back plate wherein said luminous panel comprises at least one light-blocking region and at least one light-passing region defining design and wherein said light-passing region defines a plurality of voids therethrough;
  c. a light source comprising at least one light generator, said light source disposed between said back plate and said inner structure frame wherein said at least one light generator is configured for generating light that propagates through said light-passing region and does not pass through said light-blocking region;
wherein said plurality of voids are selected to provide a predefined level of light and wherein said design conveys at least one of (a) an artistic design or (b) information when said light source is on and off.

17. A luminous apparatus as in claim 16, wherein at least one void from said plurality of voids is sized to be a harmonic multiple of the fundamental frequency for the wavelength of light generated by said at least one light generator.

18. A luminous apparatus as in claim 16, wherein said luminous apparatus defines the perimeter of a window and wherein the center of the luminous apparatus defines a sunlight luminous panel diffuser configured to all diffuse sunlight through said sunlight luminous panel diffuser during the day to define a first signature lighting experience.

19. A luminous apparatus as in claim 18, wherein said luminous module generates a second signature lighting experience when said at least one light generator is on and there is no sunlight.

20. A luminous apparatus as in claim 18, further comprising an energy storage device configured to store energy derived from sunlight during the day and wherein said at least one light generator is powered by said stored energy when there is no sunlight.

* * * * *